United States Patent [19]

Tretiakoff et al.

[11] Patent Number: 5,718,588
[45] Date of Patent: Feb. 17, 1998

[54] TACTILE DISPLAY DRIVEN BY SHAPE MEMORY WIRES

[75] Inventors: Oleg B. Tretiakoff; Andree B. Tretiakoff, both of Jensen Beach, Fla.

[73] Assignee: Blazie Engineering, Inc., Forest Hill, Md.

[21] Appl. No.: 410,293

[22] Filed: Mar. 24, 1995

[30] Foreign Application Priority Data

Mar. 29, 1994 [FR] France ............................ 94 03941000

[51] Int. Cl.$^6$ ................................................. G09B 21/00
[52] U.S. Cl. ........................ 434/114; 434/113; 340/407.1
[58] Field of Search ................................. 434/112, 113, 434/114; 340/407.1, 407.2; 116/DIG. 17

[56] References Cited

U.S. PATENT DOCUMENTS

| | | |
|---|---|---|
| 4,664,632 | 5/1987 | Tretiakoff et al. . |
| 5,086,287 | 2/1992 | Nutzel ......................... 434/112 X |
| 5,165,897 | 11/1992 | Johnson . |

OTHER PUBLICATIONS

"Final Report for NIH Grant No. 2 R44 EY06512-02", submitted by TiNi Alloy Company, Feb. 9, 1990.

*Primary Examiner*—Jeffrey A. Smith
*Attorney, Agent, or Firm*—Jacobson, Price, Holman & Stern, PLLC

[57] ABSTRACT

Tactile display comprising an array of dots, preferably arranged in rows and columns, capable of showing both Braille characters and two-dimensional tactile graphics, in which the displacement of the dots is obtained by the action of opposite shape memory wires, one for each direction of displacement.

The tactile dots are kept in their raised or recessed positions by the action of elastic locking mechanisms, energy being used only to change the dot pattern.

The thickness, weight and power requirement of the display allow its use in conventional electronic notebooks, as a replacement or a complement to ordinary displays, when used by visually handicapped people.

8 Claims, 5 Drawing Sheets

TACTILE DISPLAY DRIVEN BY SHAPE MEMORY WIRES

BACKGROUND OF THE INVENTION

The present invention relates to tactile displays. These displays, designed for visually handicapped people, are made of a flat reading surface comprising small holes, arranged in a regular array of rows and columns, through which electro-mechanical drivers can raise or recess the hemispherical top of small cylindrical rods, in such a way that they represent, either Braille characters, or any other dot pattern to be read by touch.

The present invention more precisely relates to tactile displays in which the tactile dots are driven by shape memory wires.

DESCRIPTION OF THE PRIOR ART

In currently available tactile displays, each tactile dot is moved up and down by its own individual driver, either electro-magnetic or piezo-electric.

When such a display comprises only a small number of rows, for example 3 or 4, as to constitute a single line of Braille characters, the drivers can be stacked horizontally in order to keep the total height of the display as low as possible, typically within about one inch. An example of such a display is described in the U.S. Pat. No. 4,664,632 dated May 12, 1987.

When more rows are necessary, to build for example more than two Braille lines, each driver must be located underneath the corresponding dot, to keep it within the horizontal area available for each dot, typically 0.01 square inch. Due to the length of the driver, the height of the display increases up to about two inches, as shown also in the U.S. Pat. No 4,664,632.

Such displays are also expensive to build, due to the individual cost of the accurately manufactured parts needed, such as piezo-electric reeds and due also to the cost of the electronic components, such as high-voltage transistors, required to drive them.

It has already been proposed to use shape memory wires to move up and down tactile dots, as shown for example in U.S. Pat. No 5,165,897. In this Patent, each tactile dot is attached to one end of a slightly curved horizontal blade, the opposite end of which is attached to the display base plate. A shape memory alloy wire has one end attached to the blade, near the tactile dot, the other end attached to the base plate.

When an electrical current of sufficient intensity flows through the wire, its temperature rises to the value at which the wire contracts to recover its memorized initial shape, thus pulling-up the tip of the blade and the tactile dot attached to it. When the current flow is shut down, the blade, acting as a spring, goes back to its initial shape, thus bringing down the tactile dot.

This solution suffers from two main defects: the horizontal space required by each blade-wire assembly prevents the construction of more than a few rows of tactile dots, and the current flow must be maintained to keep the tactile dot up, resulting in a high consumption of electrical energy and preventing the use of such a display in applications where portability is necessary. To our knowledge, the solution proposed in this U.S. Patent has not given birth to any commercial application.

Another tactile display, using shape memory wires has been described in the N.I.H. document No 2 R44 EY06512-02 dated February 1990. In this tactile display, each dot is kept in its up position by a coil spring. A shape memory alloy wire is attached by one end to the dot, by its other end to a base plate supporting the whole assembly. When a current pulse of sufficient intensity and duration is sent through the wire, it contracts and pulls the dot down while compressing the coil spring. When the dot reaches its lower position, a spring-like lock is triggered, which keeps the tactile dot in its lower position after the end of the current pulse. This design significantly decreases the electrical power requirements of the display, but necessitates an additional mechanism to unlock all dots and bring them back to their upper position before displaying different dot pattern. The vertical height of such a display is comparable to the height of an equivalent piezo-electric display, but its power requirements are significantly higher.

SUMMARY OF THE INVENTION

It is an object of the present invention to remove the drawbacks of previous designs and to allow the construction of tactile displays providing the following advantages:

a minimal height, allowing its use in highly portable electronic devices, a driver design allowing the juxtaposition of any number of columns and rows of tactile dots, at the standard 0.1 inch pitch used for Braille characters, to permit the construction not only of multiple Braille lines, but also of graphical tactile dot arrays.

It is a further object of the present invention to achieve portability by insuring the lowest possible bulk and electrical power requirements, through the implementation of the following features:

elastic auto-release locks to hold each tactile dot in its raised or recessed position, use of the shortest and thinnest possible wires compatible with the required vertical dot travel and stiffness.

BRIEF DESCRIPTION OF THE DRAWINGS

A preferred embodiment of the present invention is shown in FIG. 1 to 11.

FIG. 1 shows the moving assembly half-way between its raised and recessed positions.

FIG. 4 and 5 are similar to FIG. 1 but show the dot respectively in its raised and recessed positions.

DETAILED DESCRIPTION OF THE PRESENT INVENTION

Figure 1:
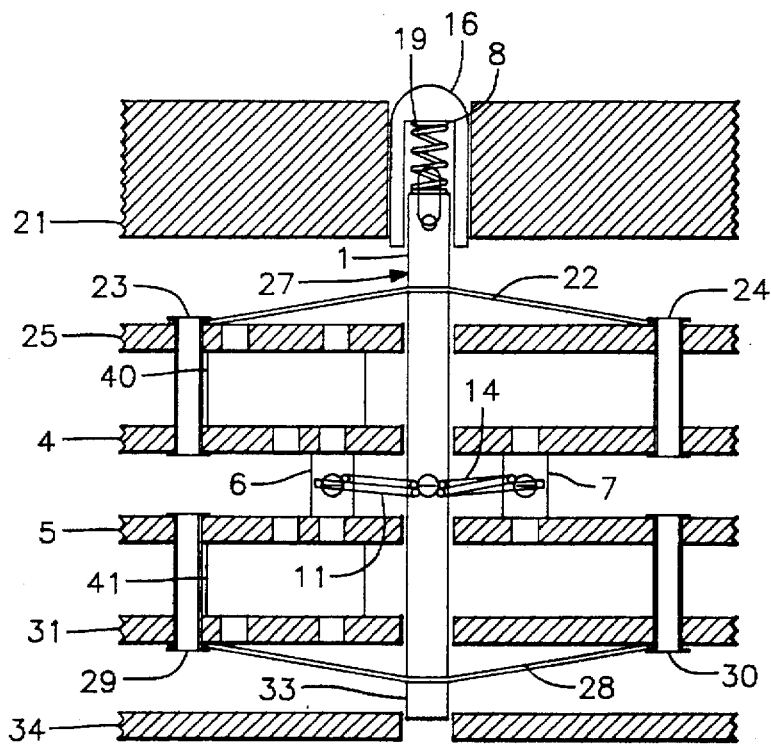
FIG. 1, 4 and 5 present a side view of all the parts needed to move and to keep raised or recessed any single dot of the display. In these figures, the top reading panel 21, the horizontal support boards 4, 5, 25, 31 and 34, as well as the tactile dot 16 and the eyelets 23, 24, 29 and 30 are shown cut vertically.
Figure 2:
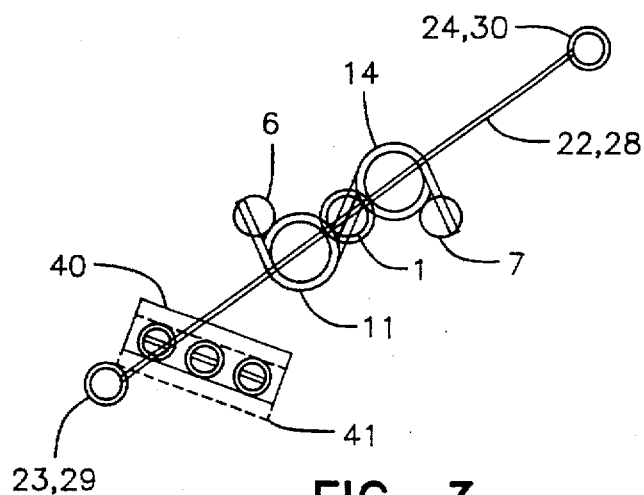
FIG. 2 of shows a plan view of the same parts with all the support boards and the upper section of the moving assembly removed.
Figure 3:
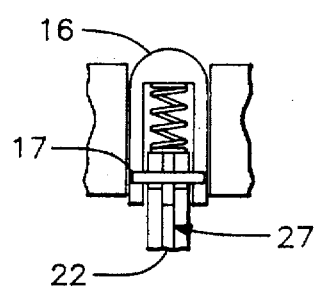
FIG. 3 of the same drawing shows, in another side view, how the tactile dot is elastically mounted on the upper section of the moving assembly.

Each dot of a tactile display according to the present invention, is attached to the upper part of a mobile assembly comprising a vertical cylindrical rod 1, two horizontal circular springs 11 and 14 to lock elastically the mobile assembly in its raised and recessed positions, and two shape memory wires 22 and 28, to move up and down the whole assembly. The mobile assemblies are mounted perpendicularly to six horizontal plates: a top reading panel 21, comprising a regular array of holes through which the tactile dots can protrude when the corresponding mobile assemblies are in their raised position, four boards 25, 4, 5 and 31 which support the mechanical elements, the electronic parts and the printed electric wires used to supply electric power to the shape memory wires, and a bottom protective plate 34.

Figure 4:
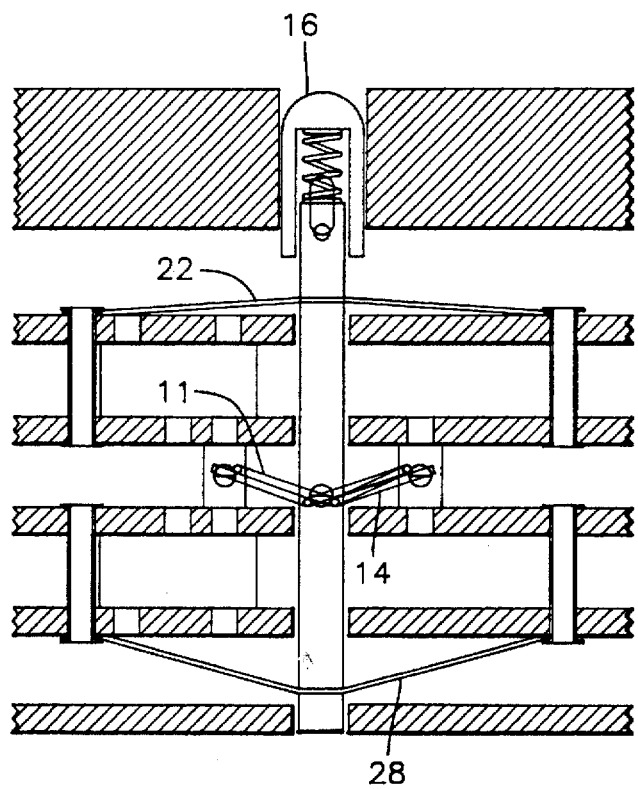
Figure 5:
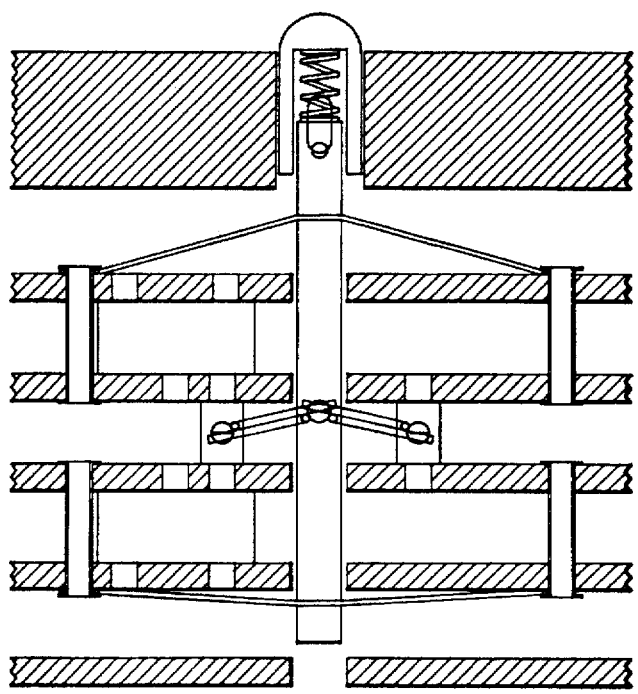

The vertical layout of these display elements is shown on FIG. 1, 4 and 5. The vertical rod 1 is allowed to move along its vertical axis through holes provided in the horizontal boards. The circular springs 11 and 14 have one end inserted, from opposite sides, into a small hole drilled into the middle of rod 1 perpendicularly to its axis. The remaining ends of each spring are similarly inserted into small holes drilled in two support rods 6 and 7, held between the boards 4 and 5, in such a way that the amplitude of the vertical displacement of the mobile assembly is defined by the distance between the inner boards 4 and 5, and by the thickness of the locking springs, their ends rotating inside said holes during the displacement.

The springs are mounted in such a way that they are compressed between the mobile rod on one side, and their respective support rods 6 and 7 on the other side. The vertical components of the compression forces keep the ends of the springs pressed against the board 4 in the raised position of the mobile assembly, and against the board 5 in the recessed position of the assembly, thus providing the desired elastic lock-up mechanism for this mobile assembly.

To prevent the user from accidentally moving a dot from its raised to its recessed position by applying an excessive pressure on the tip of the tactile dot, this dot is mounted elastically on the upper end of the mobile assembly, by using a coil spring 19 inserted between the dot 16 and the top of rod 1, which limits the force which can act downwards upon the mobile assembly if a pressure is applied to the dot protruding above the surface of the reading plate. The spring 19 is designed to insure that this force is lower than the vertical force provided by both lock springs, while insuring an adequate stiffness to the tactile dot.

A shape memory wire 22 made of a nickel-titanium alloy is attached by its ends to the eyelets 23 and 24 clamped across the horizontal boards 25 and 4, in such a way that its middle part rests in a rests in a horizontally extending portion of a vertical slot 27 cut in the upper part of the rod 1, the wire being almost horizontal and the shortest when the rod is in its lower position, and assuming an inverted V shape and being the longest when the rod is in its upper position.

Another wire 28 made of a nickel-titanium alloy is attached by its ends to the eyelets 29 and 30 clamped across the boards 31 and 5, in such a way that its middle part rests in a horizontally extending portion of a vertical slot 33 cut in the lower part of the rod 1, the wire being almost horizontal and the shortest when the rod 1 is in its upper position, and assuming a V shape and being the longest when the rod is in its lower position.

The shortest size of each wire corresponds to its contracted shape, memorized during its fabrication, and the longest size corresponds to its extended shape, obtained by pulling on the wire by a sufficient elongation force. In order to achieve a large number of extension-contraction cycles without any irrecoverable deformation of the wire, the wire elongation must be kept below a threshold depending upon the properties of the alloy used in the fabrication of the wire, typically less than 3 per cent. This condition, combined with the desired vertical travel of the tactile dot, determines the length of the wire.

The displacement of the mobile assembly from one position to the opposite position is obtained by sending an electrical current pulse through the wire to be contracted, for example the bottom wire if the rod occupies initially its lower position. The wire is quickly heated to its shape recovery temperature and then provides, during its contraction, the vertical force needed to unlock the mobile assembly and move it towards its opposite position.

The diameter of the wire is chosen to provide a force strong enough to overcome at any time during the upward motion, the sum of all the forces involved: the vertical component of the compression force of the locking springs 11 and 14, the force needed to compress eventually the dot spring 19, the force needed to elongate the opposite wire and the friction forces. During the second half of the vertical motion, the vertical component of the compression force of the locking springs helps accelerate the rod towards its new position.

The electrical current pulse is controlled by the transistors 40 and 41 respectively for the top and bottom wires. These transistors are mounted between the board supporting the wire and the nearest board supporting the locking springs. Electrical conductors, printed on these boards in directions parallel to both the rows and the columns of dots, provide to every transistor the electrical signals necessary to produce the desired current pulses through either the top or the bottom wire, at any selected dot position. These conductors constitute a network of electrical lines connected to the shape memory wires through their respective eyelets and transistors.

Figure 6:
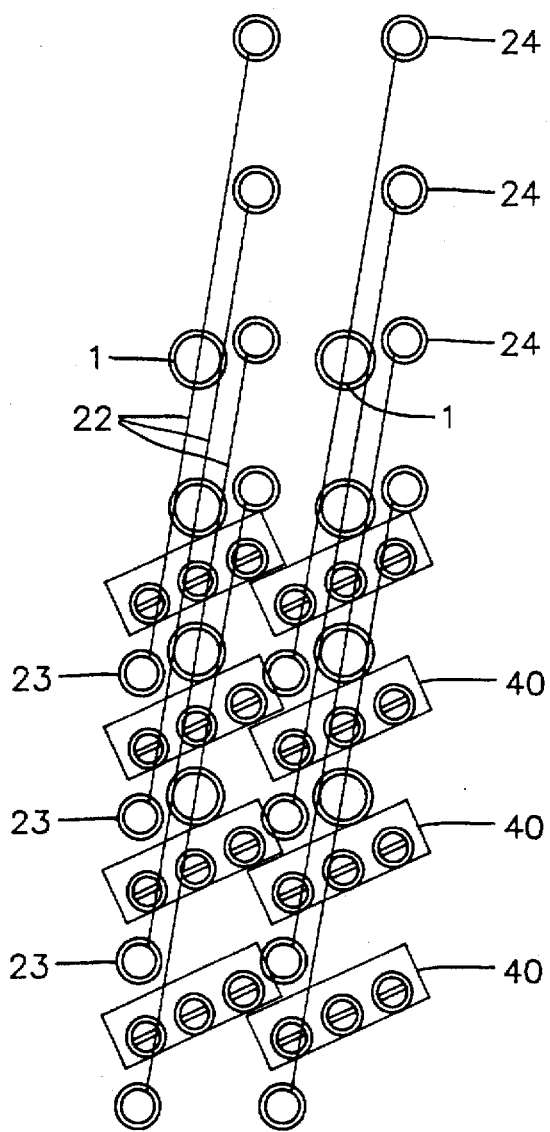
FIG. 6 shows how the wires 22, the eyelets 23 and 24 supporting the wires, the transistors 40 and the moving rods 1 are horizontally imbricated to allow the juxtaposition of the dots for a typical 8 dot Braille character.
Figure 7:
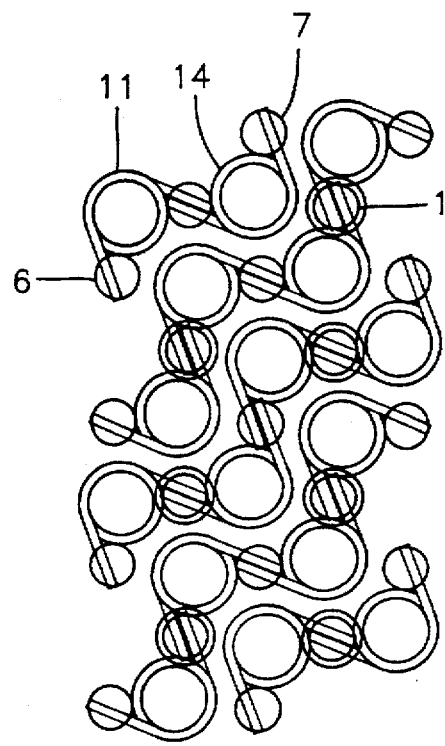
FIG. 7 similarly shows how the positioning springs 11 and 14, their supports 6 and 7, and the moving rods 1, are horizontally laid out, for the same 8 dot Braille character.

To allow the juxtaposition of any number of dots in parallel rows and colas, the volume available inside the display is divided into 5 horizontal slices. The upper slice, between the reading plate 21 and the board 25, is devoted to the top wires and the upper section of the rods 1 as shown on FIG. 6. The next slice, between the board 25 and the board 4, is devoted to the upper transistors 40, the upper eyelets and the upper-middle section of the moving assemblies, as shown also on FIG. 6. The middle slice, between the boards 4 and 5, is devoted to the locking springs, their supporting rods and to the middle section of the moving assemblies, as shown on FIG. 7, the springs being imbricated in such a way that they can move up and down without touching their neighbors. Each supporting rod can hold two springs belonging to adjacent assemblies. The two lower slices are used in a way similar to the corresponding upper slices.

The total thickness of such a display can be kept below 0.5 inch with a dot pitch of 0.1 inch. Typical wire dimensions are 0.5 inch long and 3 to 4 mils diameter, for a vertical dot travel of 32 mils.

Figure 8:
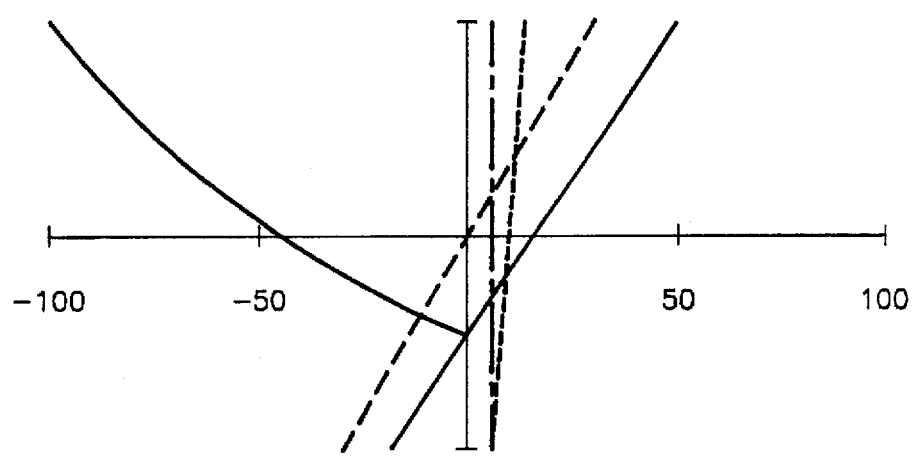
FIG. 8, 9 and 10 in drawing 4 show the variation of the various mechanical forces involved in the vertical motion of the tactile dot.

FIG. 8 represents the variation of various mechanical forces during the downward motion of the mobile assembly, when no pressure is applied to the tactile dot, its support spring being fully extended. The vertical axis represents the position of the mobile assembly, zero being its halfway position. The horizontal axis represents the values of the individual forces, measured in grams and counted positively when acting upward.

The slightly curved full line represents the traction force sustained by the heated wire to keep the assembly moving. The dotted line represents the vertical projection of the cold wire elongation force. The dashed-dotted line represents the vertical projection of the friction forces. The dashed line represents the sum of the vertical projections of the forces exerted by the locking springs and eventually the dot support spring. The full straight line represents the sum of all above vertical forces. The same forces, but with opposite signs are involved in the upward motion when no pressure is exerted on the tactile dot.

Figure 9:
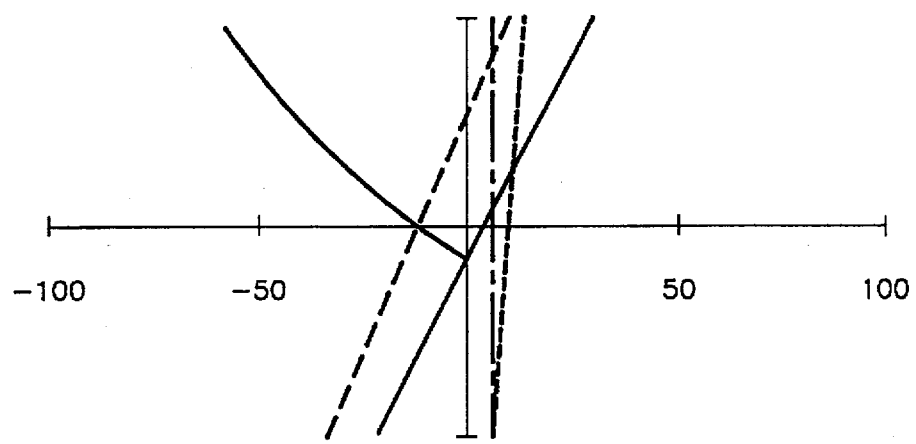

FIG. 9 represents the same forces during the downward motion of the mobile assembly, when the tactile dot is kept below the reading surface by a sufficient pressure. It can be seen that the mechanical work required from the heated wire is significantly decreased.

Figure 10:
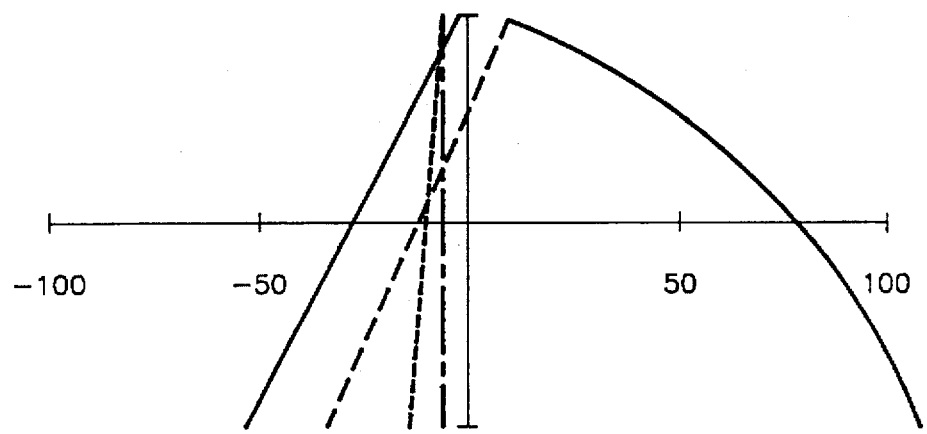

FIG. 10 represents the same forces during the upward motion of the mobile assembly, when the tactile dot is prevented from raising above the reading surface by a sufficient pressure. It can be seen that the mechanical work required from the heated wire is significantly increased. This represents the worst case scenario for which the wires must be designed.

Figure 11:
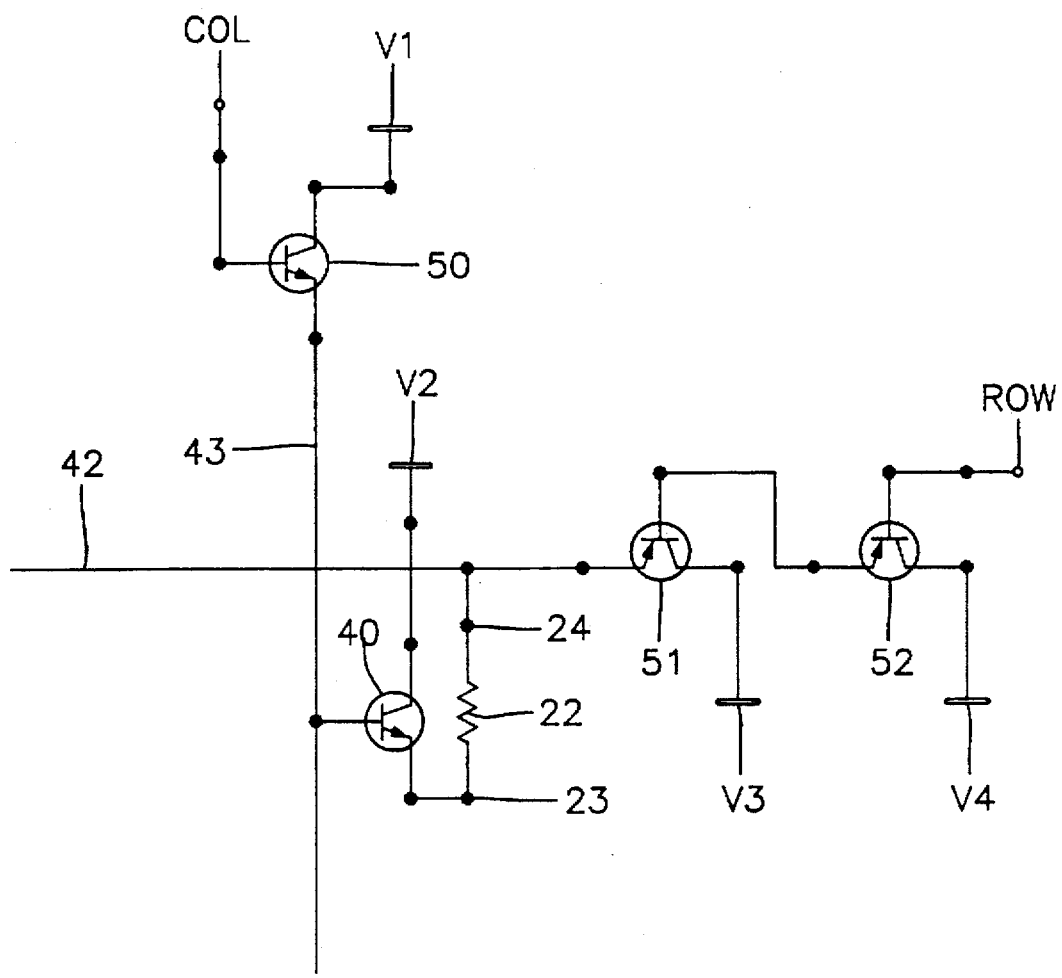
FIG. 11 shows a schematic of a preferred design for the electrical circuits needed to generate the current pulses selectively into each and any of the shape memory wires, throughout the display area.

FIG. 11 represents the basic electrical circuit used to generate the current pulse through any shape memory wire. This circuit is of a multiplexed type, in which the current pulse at any dot location is generated by combining electrical signals applied to electric conductors, one for each row and one for each column, in order to minimize the number of electronic parts required for a given number of dots.

In this figure, the wire to be heated is represented by the resistor 22. One of its ends is connected through the eyelet 23 to the emitter of the NPN transistor 40, one such transistor being necessary per wire. The other end is connected through the eyelet 24 to an electrical conductor 42 printed on one side of the board 25, and running across the whole display in a direction parallel to the rows of dots. The collector of the transistor 40 is connected to the pole V2 of a power supply, through a conductive surface printed across the surface of the board 4. The base of the transistor 40 is connected to an electrical conductor 43 printed on the other side of the board 25, and running across the whole display surface in a direction parallel to the columns of dots. Similar connections are provided for the bottom wires and transistors.

Each row conductor similar to 42 is connected to another pole V3 of the power supply, through an PNP transistor 51 which base is connected to a PNP driver transistor 52 himself connected to yet another pole V4 of the power supply. The base of the driver transistor 52 is connected to a conductor providing, when required, a row selection electrical pulse.

Each column conductor similar to 43 is connected to a pole V1 of the power supply, through a driver NPN transistor 50. The base of this transistor is connected to a conductor providing, when required, a column selection electrical pulse.

For a current pulse to flow from the pole V2 of the power supply, via the transistor 40 through the wire/resistor 22 and then via the row conductor 42 and the row transistor 51 to the pole V3 of the power supply, one must apply simultaneously a positive "column" pulse to the base of the column driver transistor 43, and a negative "row" pulse to the base of the row driver transistor 52.

The row and column transistors can be mounted on the printed circuit board& 25, 4, 5 and 31 shown on FIG. 1, on the sides of the display, while the "wire" transistors like 40 and 41 must be mounted in the immediate vicinity of the wire they feed, as shown on the same figure.

Conventional digital control circuits can be used to provide the row and column pulses needed to activate sequentially the top or bottom wire at any selected dot position, because the voltages needed are typically in the 5 to 10 volts range.

By using the above preferred embodiment of the electrical circuits, all required electrical connections are provided by the four horizontal printed circuit boards already used as a mechanical support for the mobile assemblies.

What we claim is:

1. A tactile reading device comprising:

a reading panel having a reading surface and an array of holes therethrough, a plurality of rods for displaying a dot pattern representing a graphic display above said reading surface which can be read by touch, each of said plurality of rods including a tip extending within one of said holes and being selectively displaceable in a first direction to a first position above said reading surface for display of said dot pattern and a second opposing direction to a second position below said reading surface, and a shape memory wire for effecting displacement of said tip in said first direction and an opposing shape memory wire for effecting displacement of said tip in said second opposing direction, each said shape memory wire being attached to said rod and connected to a voltage source, and an elastic looking mechanism for each rod such that the tip is maintained in a desired one of said first and second positions, whereby the rod is maintained by the action of the locking mechanism until a contraction of one wire produces a mechanical force which overrides said locking mechanism and effects displacement or the tip in a desired one of said directions, said mechanical force effecting an elongation of the opposing wire thereby biasing said opposing wire for contraction thereof.

2. A tactile reading device according to claim 1, wherein the shape memory wire is made of an electrically conductive material which can be heated to a shape recovery temperature by an electrical current pulse of sufficient intensity and duration.

3. A tactile reading device according to claim 2, wherein electrical circuits needed to provide the current pulse to each wire, are or a multiplexed type, comprising one electronic switch for each wire, connected to electrical conductors, at least one for each row and one for each column of said array, in such a way that the electronic switch located at the intersection of a particular row and column is activated by connecting said conductors selectively to the appropriate poles of an electric power supply, by the activation of other electronic switches, at least one for each row and one for each column.

4. A tactile reading device according to claim 3, wherein said electrical conductors are printed on boards extending parallel to the reading surface, said boards supporting said electronic switches at each intersection as well as said other electronic switches at the end of each said row and column.

5. A tactile reading device according to claim 1, wherein said locking mechanism includes two springs symmetrically mounted with respect to the axis of said each rod, in such a way that the two springs are permanently compressed between said each rod on one side, and support means on an opposite side, in such a way that said springs and said each rod can occupy said first and second positions.

6. A tactile reading device according to claim 1, wherein said wires are mounted substantially perpendicular to the axis of said each rod to achieve a desired tactile dot displacement, with an absolute change in said wire length significantly smaller than said dot displacement, when said wire contracts from an open V shape to an almost straight shape, said straight shape corresponding to a memorized structure.

7. A tactile reading device according to claim 1, wherein said shape memory wires, said locking mechanisms and said rods are supported by boards extending parallel to the reading surface.

8. A tactile reading device according to claim 1, wherein each tip is elastically attached to an upper part of said each rod, to prevent a user from inadvertently moving said tips away from its first position by applying an excessive pressure to said tip.

* * * * *